United States Patent
Serra et al.

(10) Patent No.: US 6,674,539 B1
(45) Date of Patent: Jan. 6, 2004

(54) PRINTING CUSTOMIZED HIGH RESOLUTION IMAGES IN A DISTRIBUTED NETWORK SYSTEM

(75) Inventors: Bill Serra, Palo Alto, CA (US); Paul Charette, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/218,766

(22) Filed: Dec. 22, 1998

(51) Int. Cl.[7] .............................................. G06F 15/00
(52) U.S. Cl. ...................................... 358/1.15; 358/442
(58) Field of Search ................................ 358/1.15, 1.1, 358/442, 444, 401, 400, 468, 1.13, 403, 296; 707/10, 104.1, 522, 527, 530

(56) References Cited

U.S. PATENT DOCUMENTS

| | | | | |
|---|---|---|---|---|
| 5,502,576 A | * | 3/1996 | Ramsay et al. | 358/444 |
| 5,552,901 A | * | 9/1996 | Kikuchi et al. | 358/468 |
| 5,767,985 A | * | 6/1998 | Yamamoto et al. | 358/402 |
| 5,995,240 A | * | 11/1999 | Sato | 358/407 |
| 6,006,231 A | * | 12/1999 | Popa | 707/101 |
| 6,006,241 A | * | 12/1999 | Purnaveja et al. | 707/512 |
| 6,012,071 A | * | 1/2000 | Krishma et al. | 707/522 |
| 6,167,442 A | * | 12/2000 | Sutherland et al. | 709/217 |
| 6,301,016 B1 | * | 10/2001 | Matsueda et al. | 358/407 |
| 6,332,146 B1 | * | 12/2001 | Jebens et al. | 707/104 |

* cited by examiner

Primary Examiner—Mark Wallerson

(57) ABSTRACT

A method for printing an image in a distributed network system is described. The distributed network system includes an image provider system, a printing service provider system, and a user terminal coupled together via a network. First, a low resolution version of the image is received in the user terminal from the image provider system. The user can customize the low resolution image using typical image processing operations. The low resolution version of the image is then sent to the printing service provider system if the image is determined to be printed. Then the printing service provider system receives a high resolution version of the image from the image provider system such that the high resolution version instead of the low resolution version of the image is printed by the printing service provider system. The customization of the low resolution image is applied to the high resolution image before it is printed. A system for printing an image in a distributed network system is also described.

20 Claims, 4 Drawing Sheets

PRINTING CUSTOMIZED HIGH RESOLUTION IMAGES IN A DISTRIBUTED NETWORK SYSTEM

BACKGROUND OF THE INVENTION

1. Field of the Invention

The present invention pertains to high resolution image printing. More particularly, this invention relates to printing customized high resolution images through a distributed network system having a number of independently administrated service provider systems.

2. Description of the Related Art

As is known, the rapid growth of the Internet, widespread use of the World Wide Web, and a trend toward deployment of broadband residential networks have led to the development of network printing. A network printing allows a printing job to be performed by a printer remote to a user terminal. In this case, both the printer and the user terminal are connected together via the Internet or Intranet. The printing content (e.g., text and/or images) and the associated printing instructions are transmitted from the user terminal to the printer via the Internet using the open standard network transmission protocol (e.g., the Hyper Text Transport Protocol). The printing instructions typically specify the type of printer used for printing and the printout format.

This prior art network printing allows the user at the user terminal to have his/her printing job done without actually owning the printer. In this case, the printer can be owned by and located at a commercial printing shop (e.g., Kinko's or PIP printing). The user does not need to spend money and efforts to purchase and maintain the printer. The printer may be a high quality and high speed printer. The user only needs to pay for his use of the printer, not the purchase price of the printer. Thus, the user can actually have his printing job done in a very cost effective manner.

Disadvantages are, however, associated with such prior art arrangement. One disadvantage is that it is typically slow and time consuming to transmit a high resolution image to the user terminal from a remote image server via the Internet, and from the user terminal to a printer via the Internet. As is known, the user terminal is typically connected to an Internet service provider (ISP) system via a relatively slow speed transmission network (e.g., a telephone network) while the ISP system is connected to other ISP systems of the Internet via a very high speed network (e.g., a T-1 or T-3 link). The transmission speed of the telephone network using MODEM is typically 28.8 Kb/second or 33.3 Kb/second while the network between the ISP systems has a data transfer rate of, for example, 1 Mb/second, or 10 Mb/second.

SUMMARY OF THE INVENTION

One feature of the present invention is to print a high resolution and high quality image quickly without having an on-site printer.

Another feature of the present invention is to allow a user to receive, view, and customize a low resolution version of an image while printing the high resolution version of the image via a remote printer through a distributed network system.

A method for printing an image in a distributed network system is described. The distributed network system includes an image provider system, a printing service provider system, and a user terminal coupled together via a network. First, a low resolution version of the image is received in the user terminal from the image provider system for viewing. The user can then customize the low resolution image by performing typical image processing operations (cropping, adding text, re-scaling, etc). The low resolution version of the image, once customized, is sent to the printing service provider system. Then the printing service provider system receives a high resolution version of the image from the image provider system such that the high resolution version instead of the low resolution version of the image is printed by the printing service provider system. Once the high resolution version of the image is received in the printing service provider system, the printing service provider system applies the customization to the high resolution image before printing the high resolution image.

A system is described that prints an image in a distributed network system having an image provider system, a printing service provider system, and a user terminal coupled together via a network. The system includes an image server in the image provider system. The image server provides a low resolution version of the image to the user terminal in response to an access request from the user terminal. The system also includes a ticket generator in the user terminal that generates and sends a printing ticket to the printing service provider system if the image is determined to be printed. A print order generator is provided in the printing service provider system to cause a high resolution version of the image to be sent from the image provider system to the printing service provider system based on the printing ticket such that the high resolution version instead of the low resolution version of the image is printed by the printing service provider system.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
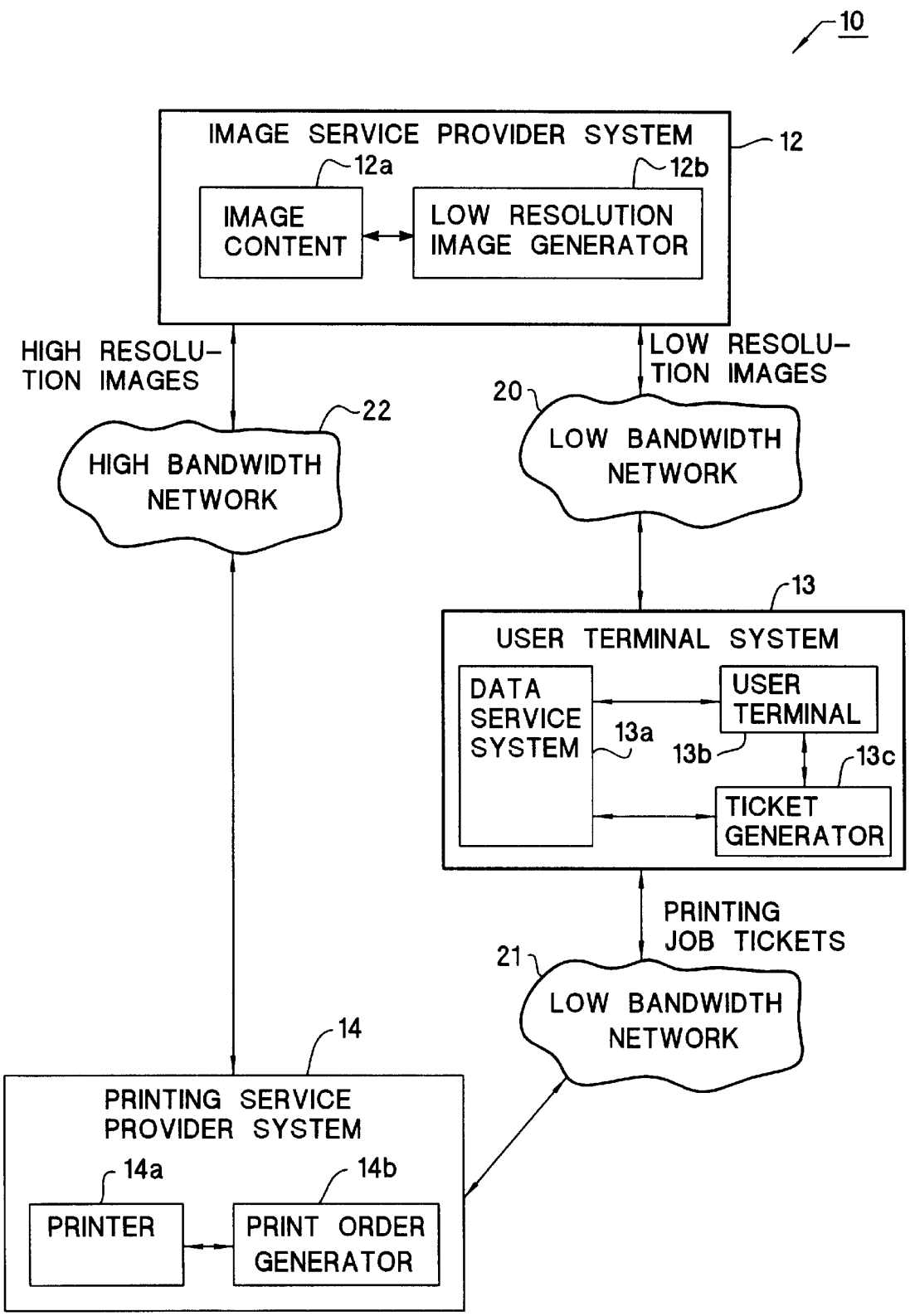
FIG. 1 is a block diagram of a distributed network printing system for printing high resolution images in accordance with one embodiment of the present invention.

FIG. 1 shows a distributed network printing system 10 that implements one embodiment of the present invention. In accordance with one embodiment of the present invention, the distributed network printing system 10 allows viewing and customization of an image transmitted from a remote source at a lower resolution while allowing the image to be printed by a remote printer at a higher resolution.

As can be seen from FIG. 1, the distributed network printing system 10 includes an image provider system 12, a printing service provider system 14, and a user terminal system 13 coupled together via networks 20–22. Data communications among the systems 12–14 are conducted using a predetermined open standard communication protocol. In one embodiment, the open standard communication protocol is the HTTP (Hyper Text Transport Protocol) protocol used for Internet/Intranet communications. Alternatively, other known open standard communication protocols can also be used.

The network 22 is a high speed network that transmits data at a relatively high data transfer rate. The network 22 can be a T-1 or T-3 link that can transmit data at, for example, 10 Mb/second. Alternatively, other known network technology can be used to implement the network 22.

The printing service provider system 14 includes at least one printer (i.e., the printer 14a). The printer 14a can be accessed by the system 13 via the network 21. For example, the user terminal 13b can send printing jobs to the printer 14a for printing. The printer 14a can be any known and commercially available printer system. In one embodiment, the printer 14a is a high quality and high speed printer that can print large-sized high resolution images at high speeds.

The image provider system 12 includes an image content site (i.e., the image content site 12a) that stores images. A content site refers to a collection of data (e.g., a database or file system) that contain a set of content data and/or applications for access. In one embodiment, the image content site 12a only stores image data. In another embodiment, the image content site 12a stores image data as well as HTML (Hyper Text Markup Language) web pages, database objects, video clips, etc. The images can be stored in the image content site 12a using several image formats. For example, the images can be stored in the gif format.

The user terminal system 13 includes a user terminal 13b connected to a data service system 13a. The data service system 13a functions as the gateway for the user terminal 13b to access the images from the image content site 12a of the image provider system 12 or the printer 14a of the printing service provider system 14.

The user terminal 13b may be at a residence, a school, or an office of the user. The user terminal 13b may include a web browser application program (or an e-mail or e-commerce application program) that allows user access to the data service system 13a or the system 12 or 14. The user terminal 13b can be, for example, a personal computer, a network computer, a notebook computer, a workstation, mainframe computer, a supercomputer. Alternatively, the user terminal 13b can be any other electronic system with data processing capabilities. For example, an Internet-enabled TV may be used as the user terminal 13b. In addition, the user terminal system 13 may include a modem or network adaptor, depending on the network technology adopted for the networks 20 and 21.

Each of the networks 20–21 can be a low bandwidth network. For example, each of the networks 20–21 can be a telephone network with a data transmission speed of 28.8 Kb/second or 33.3 Kb/second. Alternatively, each of the networks 20–21 can also be a high speed network.

Each of the networks 20–21 can be any known interconnect network. For example, each of the networks 20–21 can be an existing telephone network or a high speed network (e.g., ISDN, FDDI, or T-1 link network). In one embodiment, the data transmission rate of each of the networks 20–21 is lower than that of the network 22. In another embodiment, the data transmission rate of each of the networks 20–21 is equal to or higher than that of the network 22.

Each of the systems 12 and 14 also includes a network access mechanism (e.g., web server)(not shown in FIG. 1) that allow the respective system to communicate with another system using the open standard communication protocol. The network access mechanism can be implemented by any known technology. For example, the network access mechanism may include web servers, e-mail servers, e-commerce and news servers (these are collectively referred to as local service servers), a router, a firewall, a domain name server, an address assignment server, a proxy server, and a network address translator.

The distributed network printing system 10 is, for example, an Internet or Intranet system. In this case, each of the systems 12–14 is essentially an ISP system that includes an Internet access system (e.g., web server).

In accordance with one embodiment of the present invention, the distributed network printing system 10 also includes a low image resolution generator 12b in the image provider system 12 that can provide an image at different resolutions. The low image resolution generator 12b can also be referred to as an image generator 12b. In addition, the distributed network printing system 10 includes a ticket generator 13c in the user terminal system 13 that generates a printing job ticket to have the image printed by the printing service provider system 14, and a print order generator 14b in the printing service provider system 14 that causes the printing job to be completed.

In one embodiment, the low resolution image generator 12b employs the OpenPix standard to provide the same image at various resolution. The OpenPix standard is a known image compression format that can show the same image or region of the image at various resolutions. For example, an image can be shown at the 64×64 pixel resolution, at the 128×128 pixel resolution, at the 256×256 pixel resolution, or higher or lower resolutions. The 256× 256 pixel resolution version of the image has of course more image data than the 64×64 pixel resolution version of the same image. The OpenPix image format standard, however, does not provide for any kind of image manipulation. This means that low resolution image generator 12b does not have the ability to manipulate the image. The low resolution image generator 12b can only retrieve an image from the image content site 12a and provide the image at the specified resolution to the external entity that requests the image.

The low resolution image generator 12b always provides an image to the user terminal system 13a at a lower resolution. This allows the image to be quickly transmitted to the user terminal system 13 via the network 20 for viewing as the lower resolution requires transmission of less image data than a higher resolution would require. For example, when the user terminal 13b in the user terminal system 13 requests an image, the low resolution image generator 12b provides the image at the lowest resolution to the user terminal 13b via the network 20 in response to an access request from the user terminal 13b. If the access request from the user terminal 13b specifies the resolution, the low resolution image generator 12b will send the image at the specified resolution.

Figure 2:
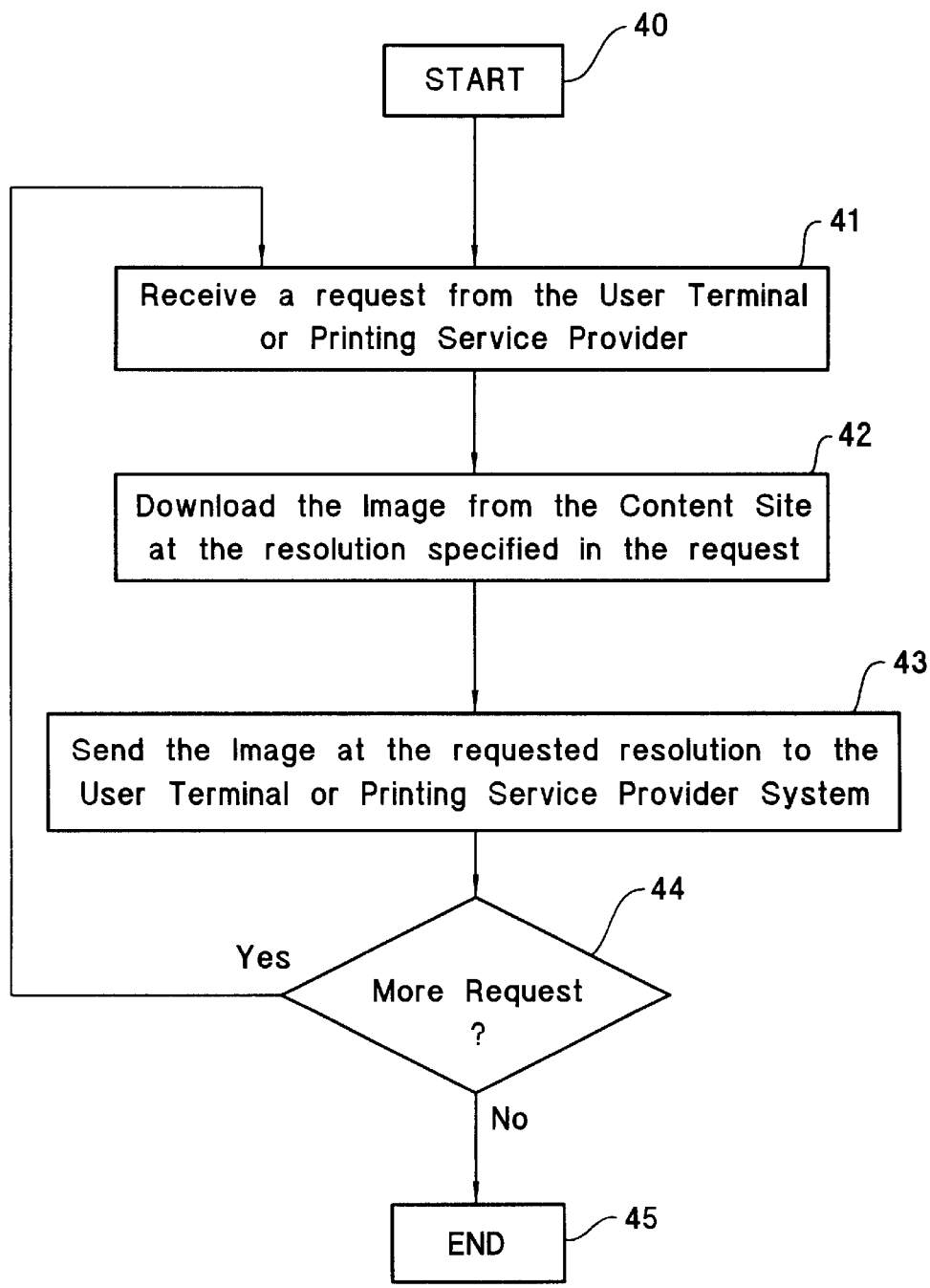
FIG. 2 shows in flow chart diagram form the process of downloading the low resolution version of an image from an image server of the network printing system to a user terminal of the network printing system.

The low resolution image generator 12b can be implemented by any known image server that implements the OpenPix image format standard. FIG. 2 shows the process of the low resolution image generator 12b in providing a requested image to an entity external to the image provider system 12 at the specified resolution. FIG. 2 will be described in more detail below.

Referring again to FIG. 1, the user at the user terminal 13b can then view and customize the image as he or she wishes. The customization of the displayed image includes typical image processing operations, such as cropping the image, rotating the image, adding overlay text to the image, placing the image on various location of a page, and scaling the image. The image customization can be done using any known image manipulation software. If the user at the user terminal 13b then determines to print the image, a printing job ticket is generated by the ticket generator 13c of the user terminal system 13. The generated printing job ticket is then transmitted to the print order generator 14b in the printing service provider system 14 via the network 21, which is also a low bandwidth network. The printing job ticket specifies all the requirements for printing the final printout of the image and all the instructions for completing the printing job. For example, the printing job ticket specifies the size of the paper, the quality of the papers, the type of the paper (e.g., colored paper or white paper), the size of the image, the amount of color, and the number of copies to be printed.

In addition, the printing ticket also includes the image in the lower resolution. If the lower resolution image has been customized (i.e., modified by the user at the user terminal 13b for printing), the customized image is included in the printing job ticket. In one embodiment, the printing job ticket is described in a PostScript page-description language. In a further embodiment, the printing job ticket is generated using the Open Pre-press Interface (OPI) software from the Adobe Systems, Inc. of San Jose, Calif. The OPI software is an extension of the PostScript language that enables users to design pages with low resolution images and then to replace those images with their high resolution versions.

When the print order generator 14b receives the printing job ticket, the print order generator 14b retrieves the same image from the low resolution image generator 12b of the image service provider system 12 via the network 22 at the specified higher resolution. This higher resolution is typically specified in the printing job ticket that was sent from the ticket generator 13c. This means that the low resolution image generator 12b sends either the image at the original highest image resolution or at a specified higher resolution lower than the highest image resolution to the printing service provider system 14.

The print order generator 14b then customizes the image at the specified higher resolution in accordance with the customized lower resolution image contained in the printing job ticket. The print order generator 14b then sends the printing job to the printer 14a for printing.

One advantage of this arrangement is that the transmission time along the networks 20–21 is shortened because only low resolution images are transmitted via those networks. This is especially true when the data transmission rate of the network 22 is significantly higher than that of the networks 20–21.

In addition, this arrangement also increases the data throughput of the network 22 because the higher resolution image only needs to be transmitted once through the network 22, thus saving additional bandwidth of the network 22 for transmitting other data. Another advantage is that the image can be quickly viewed by the user at the user terminal 13b.

Moreover, this arrangement allows the user at the user terminal 13b to print a high resolution high quality customized image without physically owning a printer. This also allows the printer 14a to be used by many users, thus increasing the effectiveness and efficiency of the use of the printer 14a.

Figure 3:
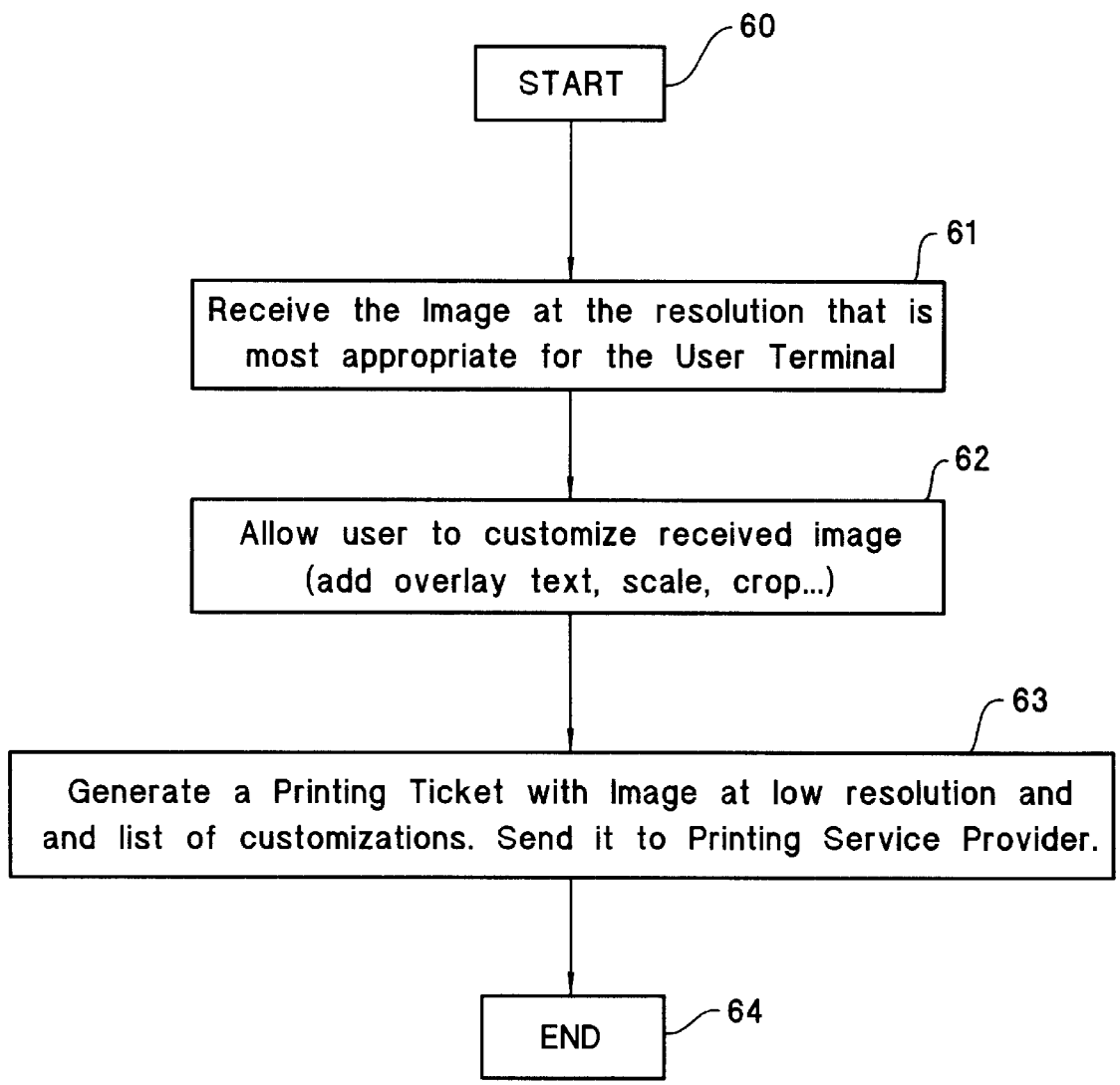
FIG. 3 is a flow chart diagram showing the process of generating and submitting a printing ticket by a ticket generator in the user terminal to a printing service provider system of the network printing system for printing the image shown on the user terminal.
Figure 4:
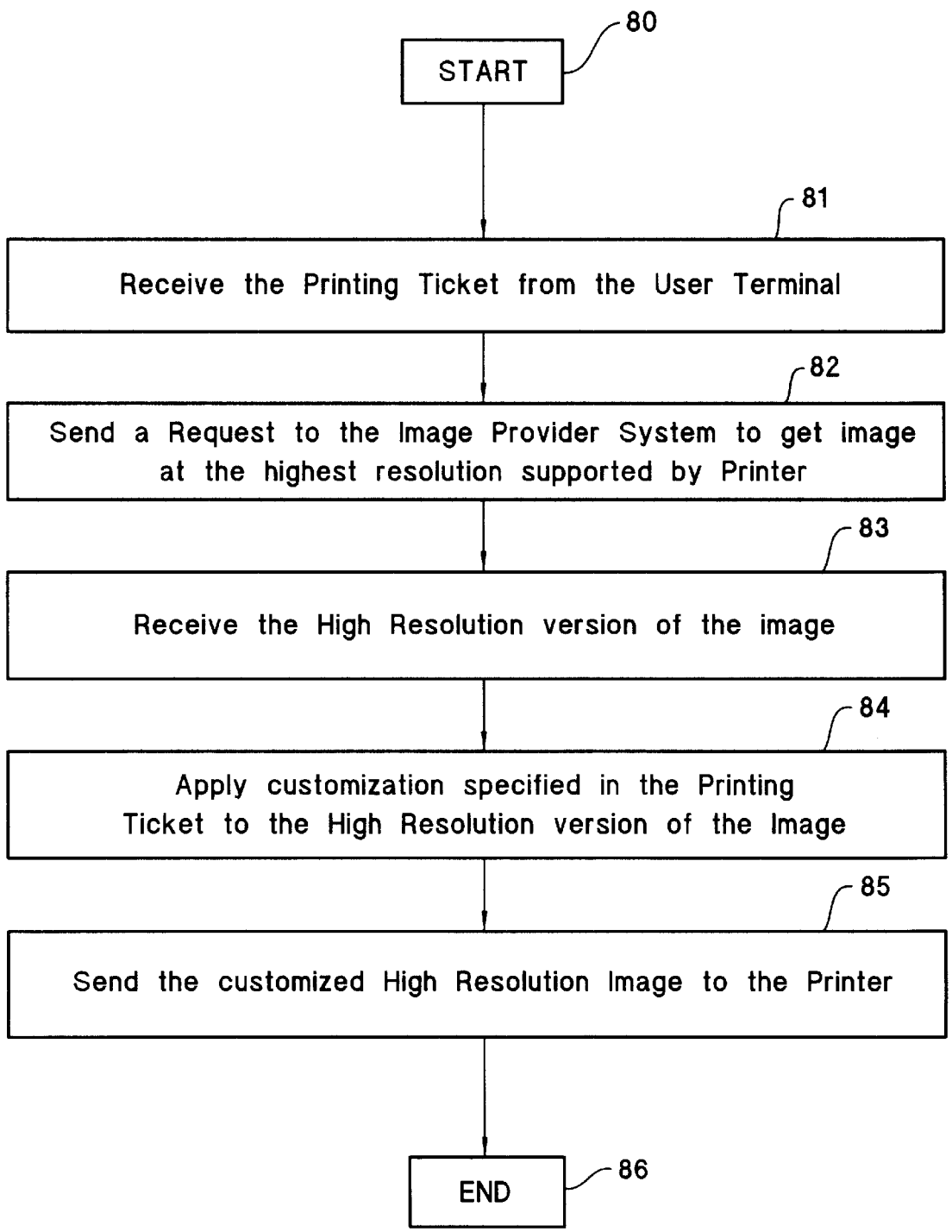
FIG. 4 is a flow chart diagram showing the process of receiving and processing the high resolution version of the image by a print order generator of the printing service provider system in accordance with the printing ticket.

Each of the ticket generator 13c and the print order generator 14b can be implemented using known technology. Each of the generators 13c and 14b can be implemented in hardware, software, or firmware. FIG. 3 shows the process of the ticket generator 13c in generating and transmitting a printing job ticket to the print order generator 14b, which will be described in more detail below. FIG. 4 shows the process of the print order generator 14b in generating final printout data of the image in accordance with the printing job ticket, which will be described in more detail below.

FIG. 2 shows in flow chart diagram form the process of downloading the image at the specified resolution by the low resolution image generator 12b in the image provider system 12 to the requesting source (i.e., either the user terminal 13b or the print order generator 14b). As described above, the user terminal 13b receives the image at the lower resolution while the print order generator 14b receives the image at the higher resolution.

As can be seen from FIG. 2, the process starts at the step 40. At the step 41, the low resolution image generator or image server 12b receives an access request. The access request can be sent from the user terminal 13b of the user terminal system 13 or the print order generator 14b of the printing service provider system 14. The access request asks the image server 12b to retrieve the image data of the requested image from the corresponding image content site 12a. The access request also specifies the resolution of the image to be transferred. At the step 42, the image server 12b then downloads the image from the appropriate content site at the specified resolution. As described above, the image is or can be stored in the image content site 12a at various resolutions. If the request is from the user terminal 13b, then the lower resolution version of the image is downloaded from the content site 12a into the image server 12b at the step 42. If the request is from the print order generator 14b, then the higher resolution version of the image is downloaded from the content site 12a into the image server 12b at the step 42.

Alternatively, the image server 12b may generate the image at the required resolution. For example, if the image required is to be transmitted at a specified low resolution, the image server 12b will generate the image at the specified low resolution. If the image required is to be transmitted at a specified high resolution, the image server 12b will generate the image at the specified high resolution.

At the step 43, the image at the specified resolution is then transmitted to the designation. Again, if the request is from the user terminal 13b, the lower resolution image is transmitted to the user terminal 13b via the network 20. If the request is from the print order generator 14b, then the higher resolution image is transmitted to the print order generator 14b via the network 22.

The process then moves to the step 44 at which it is determined if more requests have been received. If so, the process returns to the step 41. If not, the process ends at the step 45.

FIG. 3 shows in flow chart diagram form the process of generating and submitting the printing ticket for printing the image by the ticket generator 13c of the user terminal system 13 (shown in FIG. 1). This process generates and submits the printing ticket to the print order generator 14b in the printing service provider system 14. As described above, the printing ticket specifies all the requirements for printing the final printout of the image and all the instructions for completing the printing job. In addition, the printing ticket also includes the image in the lower resolution. If the lower resolution image has been customized (i.e., modified by the user at the user terminal 13b for printing), the customized image is included in the printing ticket.

As can be seen from FIGS. 1 and 3, the process starts at the step 60. At the step 61, the data service system 13a receives the image at the specified resolution (e.g., the lower resolution that is appropriate for the user terminal 13b). At the step 62, the ticket generator 13c allows the user to customize the image on the user terminal 13b. The customized image is described in, for example, the PostScript page-description language. One extension of the PostScript language is the Open Pre-press Interface (OPI) software from the Adobe Systems, Inc. of San Jose, Calif. The OPI software enables users to design pages with low resolution images and then to replace those images with their high resolution versions.

At the step 63, the ticket generator 13c generates the printing ticket and sends the printing ticket to the print order generator 14b of the printing service provider system 14. The printing ticket specifies the printout format and the page layout of the image. This may include the size of the paper, the quality and type of the paper (e.g., colored paper or white paper), the size of the image, the amount of color, and the number of copies to be printed. The printing ticket also includes printing instructions and the customized image at the lower resolution. The entire data package of the printing ticket is then sent to the print order generator 14b of the printing service provider system 14 via the network 21 at the step 63. In one embodiment, the printing ticket is generated and sent in the PostScript page-description language. Alternatively, other language can be used to generate and send the printing ticket. The process then ends at the step 64.

FIG. 4 is the flow chart diagram of the process of handling the printing ticket by the print order generator 14b to print out the image at the specified high resolution in the printing service provider system 14 (shown in FIG. 1). As can be seen from FIGS. 1 and 4, the process starts at the step 80. At the step 81, the print order generator 14b receives the printing job ticket. At the step 82, the print order generator 14b sends a request to the image server 12b of the image provider system 12 to download the image at the specified high resolution (or the highest resolution supported by the printer 14a). The download process of the image server 12b is described above, also in conjunction with FIG. 2. At the step 83, the print order generator 14b receives the image at the specified high resolution (or the highest resolution). The print order generator 14b then customize the high resolution image in accordance with the printing job ticket at the step 84. The print order generator 14b then sends the customized high resolution image to the printer 14a along with the printing instructions contained in the printing job ticket. The process then ends at the step 86.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method for printing an image in a distributed network system having an image provider system, a printing service provider system, and a user terminal coupled together, the method comprising:

receiving a low resolution version of the image from the image provider system into the user terminal via a low bandwidth network;

customizing the low resolution version at the user terminal;

sending the customized low resolution version to the printing service provider system via a low bandwidth network if the image is determined to be printed;

causing the printing service provider system to receive a higher resolution version of the image from the image provider system via a high bandwidth network, the higher resolution image not customized by the user; and causing the printing service provider to apply the customization of the lower resolution version to the received higher resolution version.

2. The method of claim 1, further comprising printing the customized higher resolution version of the image.

3. The method of claim 1, further comprising generating a printing job ticket, the printing job ticket including the customized low resolution version of the image and printing instructions; wherein the printing service provider is caused to apply the customization by sending the printing job ticket to the printing service provider system.

4. The method of claim 3, wherein the printing job ticket specifies the resolution of the higher resolution version of the image.

5. The method of claim 1, wherein each of the image provider system, the printing service provider system, and the user terminal is an independently administrated system.

6. The method of claim 1, wherein the network transmits the low and high resolution versions of the image using an open standard communication protocol.

7. The method of claim 6, wherein the open standard communication protocol is a Hyper Text Transport Protocol (HTTP) used for Internet/Intranet communications.

8. A system for printing an image in a distributed network system having an image provider system, a printing service provider system, and a user terminal coupled together, comprising:

an image server in the image provider system that provides a low resolution version of the image to the user terminal via a low bandwidth network in response to an access request from the user terminal;

a ticket generator in the user terminal that generates and sends a printing ticket to the printing service provider system via a low bandwidth network if the image is determined to be printed, the printing ticket including a customized low resolution version of the image;

a print order generator in the printing service provider system that causes a higher resolution version of the image to be sent from the image provider system to the printing service provider system via a high bandwidth network based on the printing ticket;

the print order generator further causing the printing service provider to customize the higher resolution version in accordance with the customized low resolution version such that the customized higher resolution version instead of the low resolution version of the image is printed by the printing service provider system, wherein the print order generator causes the high bandwidth network to transmit the higher bandwidth resolution version of the image instead of a difference between the higher resolution version and the low resolution version to the printing service provider system.

9. The system of claim 8, wherein when the low resolution version of the image is customized for printing at the user terminal, the ticket generator also sends the customized low resolution version of the image to the printing service provider system with printing instructions.

10. The system of claim 8, wherein the printing ticket specifies the resolution of the higher resolution version that the image server sends to the printing service provider system.

11. The system of claim 8, wherein each of the image provider system, the printing service provider system, and the user terminal is an independently administrated system.

12. The system of claim 8, wherein the network transmits the low and high resolution versions of the image using an open standard communication protocol.

13. The system of claim 12, wherein the open standard communication protocol is a Hyper Text Transport Protocol (HTTP) used for Internet/Intranet communications.

14. A distributed image printing system comprising:

server apparatus including data storage for storing original high resolution digital images and a generator for generating lower resolution versions of the original images;

a printing service provider; and a user device including means for requesting and receiving a low resolution version of at least one of the images from the server apparatus, customizing the low resolution version, generating a printing ticket, and sending the printing ticket to the printing service provider, the printing ticket including the customized low resolution version;

the printing service provider accessing, from the server apparatus, a version of the original digital image that corresponds to the customized version in the printing ticket, the printing service provider also applying the customization of the lower resolution version to the accessed version.

15. The system of claim 14, wherein the printing service provider includes a printer for printing the customized accessed version.

16. The system of claim 14, wherein the printing ticket also includes printing instructions.

17. The system of claim 14, wherein the printing job ticket specifies the resolution of the version to be accessed from the server apparatus.

18. A printing service provider comprising:

a low speed network interface;

a high speed network interface; and means for receiving a the low speed network interface, the printing ticket including a customized low resolution version of an image;

the means, in response to the printing ticket, accessing a higher resolution version of the image via the high speed network interface, customizing the higher resolution version in accordance with the low resolution version, and causing a printing apparatus to print the customized higher resolution version.

19. The printing service provider of claim 18, further comprising printing apparatus for printing the customized higher resolution version.

20. The system of claim 18, wherein the printing ticket specifies the resolution of the higher resolution version; and wherein accessing the higher resolution version includes sending a request via the high speed network interface for the higher resolution version at the specified resolution.

* * * * *